2,828,272

RUBBER COMPOSITION CONTAINING A RESINOUS DISPERSING AGENT, AND A PROCESS OF COMPOUNDING SUCH A COMPOSITION

Arthur Ullrich, Neckargemuend, Germany

No Drawing. Application February 24, 1954
Serial No. 412,400

10 Claims. (Cl. 260—4)

This invention relates to rubber compositions, and more particularly to rubber compositions having finely dispersed therethrough filler materials and other additives, and to a method of preparing such rubber compositions.

In order to improve the mechanical properties of rubber for industrial use, it is intimately mixed with certain compounding ingredients before being subjected to vulcanization. Besides sulfur, other substances, such as accelerators, softeners, reinforcing agents to improve the strength properties of the final rubber products, their hardness, elasticity and the like, fillers to reduce the costs of the final rubber products, anti-oxidants to prevent premature aging and fatigue of vulcanized rubber articles, coloring matter and others are usually added. Softeners and dispersing agents are added in order to facilitate incorporation of such reinforcing agents and fillers in compositions of natural or synthetic rubber and to cause very fine and thorough dispersion of said reinforcing agents or fillers throughout the rubber composition.

When using carbon black as reinforcing agent or filler, the degree of dispersion of said carbon black in rubber is mainly a function of the particle size. However, when using other reinforcing agents, such as, for instance, zinc oxide, magnesium carbonate, certain clays, strongly basic aluminum sulfates, alumina gel, highly dispersed calcium and aluminum silicates, colloidal silica gel and others, fillers, such as calcium carbonate, barium sulfate, kaolin, gypsum, glass powder, asbestos, graphite, and others, inorganic accelerators, such as calcium oxide, magnesium oxide, litharge and others, and/or coloring matter, such as lithopone, cadmium compounds, titanium dioxide, zinc sulfide, ultramarine blue, iron oxide, cinnabar, antimony sulfide and others, and other desired additives, it is advantageous to add special softeners and/or dispersing agents to such rubber compositions in order to insure intimate mixing of said reinforcing agents, fillers, accelerators, coloring matter and other additives with rubber and to finely disperse said agents throughout such rubber composition. Heretofore stearic acid, the metal soaps of fatty acids, pine tar, bitumen, wool fat, lecithine, asphalt, and others, were used, for instance, as such softeners and/or dispersing agents.

These and other softeners and/or dispersing agents for reinforcing agents, fillers, coloring matter, accelerators, and other additives to rubber compositions have a number of disadvantages. Some of them do not effect sufficient distribution of the additives throughout the rubber composition but tend to cause lump or cluster formation of said additives. Others seriously impair the strength properties of vulcanized rubber articles made therefrom and, therefore, can be used for special purposes only. A number of such dispersing agents can be employed for certain types of additives only and, therefore, will find only limited application. Most of said known additives are not capable of allowing ready incorporation of certain synthetic resins into rubber compositions. It is, for instance, very difficult to properly admix polyvinyl derivatives, such as polyvinylchloride, polyvinyl acetate, and others, polyacrylic acid esters, styrene polymerization products and the like, into rubber compositions and to satisfactorily and uniformly distribute and disperse such synthetic resins which are also frequently used as softeners for rubber, throughout said compositions.

It is one object of this invention to provide dispersing agents for rubber compositions which permit uniform distribution and extremely fine dispersion of reinforcing agents, fillers, coloring matter, accelerators, softeners and other additives throughout said rubber compositions.

Another object of this invention is to provide rubber compositions having uniformly distributed and finely dispersed therethrough reinforcing agents, fillers, coloring matters, accelerators, softeners and other additives.

A further object of this invention is to provide a method of incorporating such dispersing agents either alone or together with reinforcing agents, fillers, coloring matter, softeners, and/or other additives into rubber compositions.

Other objects of this invention and advantageous features thereof will become apparent as the description proceeds.

In principle, the present invention consists in the use of specific dispersing agents which have a high dispersing power and facilitate incorporation of reinforcing agents, fillers, coloring matter, accelerators, softeners, and other additives into rubber compositions. Said specific dispersing agents are obtained by treating, with oxidizing agents, and more particularly with nitric acid, extractive matter obtained on selectively extracting petroleum or the like mineral oils, until a brownish black resinous product which is brittle in the cold, is formed.

Such resinous oxidation products are preferably produced from high boiling extracts of mineral oils obtained by selectively extracting said mineral oils and especially petroleum fractions in the kerosene and heavier boiling ranges by means of suitable solvents. Conventionally used solvents used for this purpose are, for instance, liquid sulfur dioxide, as employed in the Edeleanu-process, nitrobenzene, propane, phenol, $\beta, \beta$-dichloro ethyl ether (Chlordex), furfural and others. Especially suitable extracts of this type start to distill at least at about 250° C., whereby at least about 65% of their constitutes distill above 360° C. Said extracts are furthermore characterized by their solubility in concentrated and fuming sulfuric acid wherein they are soluble to at least 40%. Preferred are such extracts or fractions of extracts which are substantially completely soluble in concentrated sulfuric acid. A suitable material of this type of selective mineral oil extracts is known as naftolene and consists of unsaturated vulcanizable hydrocarbons which boil between about 200° C. and about 380° C. The higher the viscosity of said extracts, the more suitable are the resulting oxidation products with nitric acid for use as dispersing agents in rubber compositions. Therefore, it is of advantage to use extracts or fraction of extracts as starting materials for reaction with nitric acid that have previously been subjected to a distillation operation. Thereby constituents of said extracts of lower boiling point are removed and the viscosity of the extract is increased.

Especially suitable selective extracts of mineral oils are extracts obtained by selective extraction with furfural. Preferred fractions of such extracts contain considerable amounts of aromatic compounds, and primarily naphthenes of varying compositions and high-boiling resinous products containing carbon, hydrogen, and oxygen in the approximate proportion of 80:10:5. Said resinous products consist also of cyclic naphthenic compounds which, according to our present knowledge, are apparently interlinked with each other by acyclic hydrocarbon bridges. Such extracts are unsaturated and have a comparatively high iodine number (100 to 120 or even higher).

Extracts of such type are preferably treated with nitric acid. The nitric acid concentration is preferably about 50% and higher. Advantageously 85% nitric acid ($d_{20}$:1.48) has proved to be especially suitable although useful resins can be obtained with a nitric acid concentration as low as about 10%. The reaction temperature is preferably at least 80° C. and, more advantageously, around about 90° C. Reaction at lower temperature and even at room temperature is, however, also possible whereby the nitric acid must, of course, be allowed to react with said extract for a longer period of time. In general, the end point of the reaction is reached when about 50% of the nitric acid added is consumed and a brown to black resinous mass is obtained which becomes brittle in the cold. Unreacted nitric acid is preferably removed by heating the reaction mixture to about 140° C. to evaporate said acid. Removal of said excess acid may also be effected by washing and/or neutralization of the reaction mixture.

The reaction products of selective extracts of mineral oils with nitric acid are, in general, brown to black resinous products which become brittle in the cold, which have a softening point of at least 50° C. (measured by the ring and ball method), which have a nitrogen content between about 1.0% and about 5.0%, and which are soluble in benzene, benzine, chloroform, and ethanol. Resins having a nitrogen content of 3% and higher and a softening point of 60° C. and higher are the preferred ones. The invention, however, is not limited to such resinous compounds but comprises any reaction product obtained by subjecting to the action of nitric acid extractive matter obtained by selective extraction of mineral oils and containing a mixture of compounds of which polycyclic naphthenic compounds and high molecular unsaturated compounds as well as petroleum resins may especially be mentioned. Said selective extracts contain also certain amounts of aromatic compounds depending upon their origin. As is evident, the starting selective mineral oil extracts represent a mixture of a number of chemically different compounds which, by the action of nitric acid, are resinified to new and valuable resinous products.

While the course of reaction taking place during said treatment with nitric acid is not intended to be limited to any particular theory, it is believed that no substantial introduction of nitro groups into the mixture of compounds of the starting material takes place but that, for instance, the oxidizing effect of nitric acid splits open the naphthene and other polycyclic ring systems whereby oxygen containing hydrocarbons are formed and nitrogen is attached to the molecule, probably in heterocyclic linkage. Formation of polynitro aromatic compounds does not take place since such polynitration ordinarily requires the use of strongly acting nitrating agents, especially of mixtures of highly concentrated nitric acid and concentrated sulfuric acid, whereby the oxidizing action of nitric acid is suppressed. In contrast hereto nitric acid in the concentration and under the conditions used exerts mainly an oxidizing effect. It appears to be essential for the production of suitable dispersing agents according to this invention to use for such nitration-oxidation reaction mixtures of compounds, such as they are present in said selective mineral oil extracts obtained by furfural, sulfur dioxide, and the like extraction, because only the nitration products of such mixtures are capable of improving the properties of rubber compositions by facilitating incorporation of reinforcing agents and fillers into such rubber compositions and replacing part of the rubber in such rubber compositions by said nitration mixtures.

The theory may be advanced without, however, being limited to such a theory that the new dispersing agents change the carbophilic character of natural rubber and that of most types of synthetic rubber into a hydrophilic character, thereby decreasing the surface tension and, thus, reducing the energy required to cause proper mixing of the ingredients of such rubber compositions to a minimum.

Rubber articles manufactured from rubber compositions compounded with dispersing agents according to the present invention show an especially intimate dispersion of fillers, reinforcing agents and the like. Any cluster or lump formation of such fillers etc. is completely avoided. To achieve as fine a dispersion of such fillers, reinforcing agents and the like throughout the rubber composition as possible is, of course, of utmost importance because the finer and more intimate said ingredients are dispersed therethrough, the better are the mechanical properties of rubber articles made therefrom and the higher is the resistance of said articles to wear and tear.

The amounts of dispersing agents to be added to rubber compositions may, of course, vary considerably. In general, amounts of at least about 2.5% are required. Best results are achieved by admixing 5% to 15% although amounts up to 50% and even more may be added under certain specific conditions.

It is a conventional procedure in the rubber industry to determine the preferred amounts of an ingredient to be added to a rubber composition by carrying out preliminary compounding tests with varying amounts of said ingredient, by determining various characteristic strength properties and the like of vulcanized rubber articles made from such compositions, and by selecting the specific composition yielding the best results. Among the properties to be determined are, for instance, the following: Tearing strength or ultimate strength, elongation at break in percent, resistance to wear or abrasion, resilience, DVM hardness index (or index of plasticity), modulus of elasticity on impact, tear resistance by split test, and others as they are conventionally used in the rubber industry.

Use of dispersing agents according to the present invention considerably improves, for instance, the tearing strength or ultimate strength, elongation at break, modulus of elasticity on impact, and the resistance to wear or abrasion. Said dispersing agents, furthermore, impart excellent aging properties and resistance to cold to vulcanized rubber articles compounded therewith. When applying to such rubber articles dynamic bending stress, fatiguing failure is observed at a considerably later time than with rubber articles not having incorporated therein dispersing agents according to the present invention.

Said dispersing agents have the further characteristic property that they are capable of forming gels with polyvinylchloride on heating. This property allows incorporation of much greater amounts of said polymer into rubber compositions than heretofore possible. Said high dissolving power of dispersing agents according to this invention is not limited to polyvinylchloride. Other polyvinyl resins, such as polyvinyl acetate and other polyvinyl esters, polyacrylic and polymethacrylic acid esters, styrene polymers are also dissolved and gelified by said agents and, thus, readily and intimately dispersed throughout and thoroughly compounded with rubber compositions.

Rubber compositions which contain dispersing agents according to the present invention are compounded in a manner known per se. Such rubber compositions may contain, for instance, conventional vulcanizing agents, such as sulfur, vulcanization accelerators, such as thiocarbanilide, hexamethylene tetramine, methylene-p-toluidine, methylene dianiline, diphenyl guanidine, triphenyl guanidine, di-o-tolyl guanidine, dibenzothiazyl disulfide, benzothiazyl disulfide, mercapto benzothiazole, tetramethyl thiuram disulfide, zinc dimethyl dithiocarbamate, cyclohexyl ethylamine dithiocarbamate, phenyl methyl dithiocarbamic acid and others. As filler materials there are conventionally used calcium carbonate and others, as reinforcing fillers carbon black, zinc oxide and others, as inorganic accelerators and agents enhancing the accelerating effect of organic accelerators, such as calcium oxide and others, as coloring matter lithopone and others as they have been mentioned hereinbefore. Also of importance is the addition of antioxidants or age-resistors, such as aldol-$\alpha$-naphthylamine, N-phenyl-$\beta$-naphthylamine, di-$\beta$-naphthyl-p-phenylene diamine and others. Reclaimed rubber, plasticizers and softeners, such as factice, oils, resins, waxes, and the like may also be added. Fatty acids, such as stearic acid, wool fat acids and the like are frequently admixed since they have not only a softening effect but improve considerably the properties of vulcanizates made from lower grade rubber. Other softeners used in rubber compounding have been mentioned hereinabove. It is a characteristic feature of the present invention that, in general, any rubber composition containing conventional ingredients is improved by compounding with dispersing agents according to the present invention.

As rubber material there can be used not only natural rubber, for instance, in the form of smoked sheets, but also its isomer natural polymerization product, such as balata and guttapercha. Synthetic rubber, such as butadiene polymers and other polymerization products which can be vulcanized by sulfur or agents splitting off sulfur are, of course, also used for this purpose. Such polymerization and mixed polymerization products may be derived from butadiene, its derivatives, and its substitution products and comprise, for instance, polymerization products and mixed polymerization products of 2-chloro butadiene, 2-chloro-3-fluoro butadiene, 2,3-dimethyl butadiene, 2-methyl-butadiene or isoprene, the various types of "Buna" rubbers, such as "Perbunan" made from interpolymerization of butadiene with acrylonitrile, "Buna S" made from butadiene and styrene, or copolymerizates of isobutylene and butadiene known as "Butyl rubber" and others.

As stated above, with natural or synthetic rubber addition of the dispersing agent according to this invention in amounts of 5% to 15% yields best results and causes most intimate dispersion of fillers and reinforcing fillers throughout such rubber compositions and remarkable improvement of the strength properties of vulcanized rubber products made therefrom. Usually addition of larger amounts than about 15% do not cause further improvement of the properties of such rubber products. However, when using natural or synthetic rubber in latex form, i. e., in the form of an aqueous emulsion of such natural or synthetic rubber, much larger amounts of said dispersing agent can be incorporated into said latex. In this manner, it is possible to admix to rubber 60% and even more of the dispersing agent. After coagulation of the aqueous dispersion and working up the coagulate, rubber products and articles of excellent properties are obtained.

The following examples serve to illustrate the production of the dispersing agent and the production of rubber compositions compounded with such dispersing agents according to the present invention. It is to be understood, of course, that the invention is not limited to the precise mode of procedure hereinafter described as the invention, as defined in the appended claims, can be embodied in a plurality and variety of forms and can be practiced in a plurality and variety of ways.

Starting materials for Examples 1, 2, and 3: Furfurol extracts obtained on refining mineral oil having the following characteristic properties are used as starting material in Examples 1, 2, and 3:

|  | Example | | |
|---|---|---|---|
|  | 1 | 2 | 3 |
| Density at 20° C | 1.000–1.012 | 1.005–1.016 | 0.979 (at 60° C.) |
| Viscosity according to Engler at 99° C. | 7.4–9.5 | 18–27 | 2.96 |
| Hard asphalt content | 0.03% | 0.02% | 0.02%. |
| Flash point | 265° C. | 280° C. | 229° C. |
| Neutralization number | 0.07 | 0.04 | 0.00. |
| Saponification number | 0.49 | 0.56 | 0.36. |
| Reflected color | greenish | greenish | greenish. |
| Ash content | 0.044% | 0.029% | 0.022%. |
| Carbon content | 86.79% | 86.61% | 87.70%. |
| Hydrogen content | 9.55% | 10.13% | 9.90%. |
| Nitrogen content | 0.44% | 0.57% | 0.45%. |

Distillation characteristics:

|  | Example | | |
|---|---|---|---|
|  | 1 | 2 | 3 |
| Begin of distillation °C | 295 | 254 | 283 |
| 300° C percent | 1.0 | 4.0 | 0.5 |
| 310° C do | 1.5 | 6.0 | 0.8 |
| 320° C do | 2.0 | 8.0 | 1.0 |
| 330° C do | 3.0 | 10.0 | 2.0 |
| 340° C do | 5.0 | 13.0 | 4.0 |
| 350° C do | 7.0 | 16.5 | 7.0 |
| 360° C do | 17.5 | 25.0 | 14.0 |

EXAMPLE 1

125 cc. of nitric acid ($d_{20}$:1.48) are added within 5 hours to 405 g. of the above characterized extract while stirring. The reaction temperature is kept between 80° C. and 100° C. during acid addition. The temperature is then increased to 130–140° C. and the reaction mixture is stirred at said temperature for about 1 hour to complete the reaction. At the beginning of the reaction considerable foaming takes place. The reaction proceeds exothermically. 460 g. of a porous reddish brown resinous mass are obtained. Softening point: 56.8° C. Nitrogen content: 3.70%.

EXAMPLE 2

135 cc. of nitric acid ($d_{20}$:1.48) are added, within 8 hours, at a temperature between 90° C. and 110° C. to 415 g. of the above characterized extract, while stirring. After acid addition, the temperature is increased to 130–140° C. and the reaction mixture is kept at said temperature for 1 hour. The reaction proceeds exothermically. The reaction mixture, however, does not foam as strongly as that of Example 1. 472 g. of a reddish brown, brittly-hard resinous mass is obtained. Softening point: 70.6° C. Nitrogen content: 3.55%.

EXAMPLE 3

180 cc. of nitric acid ($d_{20}$:1.48) are added, at the beginning drop by drop, to 440 g. of the above characterized starting material, while stirring. Altogether 10 hours are required for adding the nitric acid while the reaction mixture is kept at a temperature of about 90° C. and the temperature is increased only during the last two hours to 130–140° C. The reaction proceeds strongly exothermically.

The yield of the finished product amounts to 460 g. Softening point: 62. Nitrogen content: 4.40%.

These three experiments show that with decreasing viscosity of the starting extracts (a) The speed of reaction causing resinification (oxidation by nitric acid) increases, that (b) The nitrogen content of the resins increases, and that (c) The softening point of the resins decreases.

Consequently, in practical operation extracts are preferred the viscosity of which is around 10° Engler in order to reduce foaming of the extracts to a tolerable and practical extent on addition of nitric acid.

EXAMPLE 4

The following experiments show that satisfactory resinous products are produced by reacting a selective extract obtained by furfurol extraction of mineral oil with varying amounts of nitric acid of varying concentration. The starting material has the following characteristics:

| | |
|---|---|
| Density at 20° C. | 1.012 |
| Viscosity according to Engler at 99° C. | 8.4 |
| Hard asphalt content___percent__ | 0.02 |
| Flash point___° C__ | 275 |
| Neutralization number | 0.04 |
| Saponification number | 0.38 |
| Reflected color | Greenish |
| Ash content___percent__ | 0.02 |
| Carbon content___do___ | 87.1 |
| Hydrogen content___do___ | 9.9 |
| Nitrogen content___do___ | 0.43 |

Distillation characteristics:

| | |
|---|---|
| Begin of distillation___° C__ | 282 |
| 300° C___percent__ | 2.0 |
| 310° C___do___ | 6.0 |
| 320° C___do___ | 8.0 |
| 330° C___do___ | 10.0 |
| 340° C___do___ | 13.0 |
| 350° C___do___ | 18.5 |
| 360° C___do___ | 23.0 |

Varying amounts of nitric acid, as stated hereinafter, are added, while stirring, to 100 g. each of said extract whereby said addition is carried out so slowly that no excessive foaming takes place. After addition of said acid, the reaction mixture is carefully heated to 140° C. and kept at said temperature until foaming ceases. The resulting resinous mass represents the dispersing agent according to the present invention.

| HNO₃, percent | HNO₃, cc. | Temp., ° C. | Nitrogen added, g. | Nitrogen reacted, g. | Yield of resin, g. | Color | Softening point, ° C. | Nitrogen content, percent | Nitrogen yield, percent |
|---|---|---|---|---|---|---|---|---|---|
| 10.2 | 165 | 85 | 3.74 | 1.56 | 139 | brown | 88 | 1.13 | 41.7 |
| 20.6 | 83 | 90 | 3.80 | 1.78 | 117 | black-brown | 87 | 1.52 | 47 |
| 44.7 | 15 | 90 | 1.49 | 0.87 | 105 | black | 75 | 0.83 | 58.4 |
| 59.8 | 23 | 90 | 2.98 | 1.51 | 108 | ___do___ | 81 | 1.40 | 50.4 |
| 89.5 | 15 | 90 | 2.98 | 1.39 | 99.5 | ___do___ | 79 | 1.40 | 46.7 |
| 89.5 | 8.5 | 130 | 1.69 | 1.02 | 102 | ___do___ | 76 | 1.00 | 60.4 |

All the resins obtained thereby—with the exception of resins 3 and 6, having too low a nitrogen content since the amount of nitric acid (100%) was too small—are useful dispersing agents for rubber compositions.

EXAMPLE 5

100 parts of a mixed polymerization product of butadiene and styrene are intimately mixed with 50 parts of a 50% aqueous emulsion of a refining residue obtained on extracting mineral oil by means of sulfur dioxide according to the Edeleanu process and treating with nitric acid as described in the preceding examples, said resin having a softening point at 71° C. (determined by the ball and ring method) and a nitrogen content of 4.1%. The water is removed by pressing and drying and the mixture is processed and masticated between rollers. Addition of said resin emulsion allows very readily processing and working said types of synthetic rubber which ordinarily can be masticated only with great difficulty. Increased plasticity is imparted to said polymers so that incorporation of fillers is considerably facilitated. The mechanical strength properties of vulcanized products made from such rubber compositions are remarkably improved. Furthermore, the emulsified resinous additives impart to said vulcanized product excellent aging properties and resistance to cold.

EXAMPLE 6

25.0 parts of smoked sheets
10.0 parts of the resin of Example 2
1.0 part of sulfur
0.5 part of mercaptobenzothiazol
0.5 part of diphenyl guanidine
2.0 parts of zinc oxide
55.0 parts of silicon dioxide known to the trade under the trademark "Teg," and
6.0 parts of reclaimed rubber are intimately masticated with each other and vulcanized at 3 to 4 atmospheres gauge for 25 minutes. The resulting vulcanized product has an ultimate strength or tearing strength which is about 50% higher than that of a vulcanized product made without addition of said resin. Elongation, elasticity on impact, and resistance to abrasion are also considerably improved.

EXAMPLE 7

100.0 parts of an emulsion mixed polymerization product of butadiene and styrene
10.0 parts of zinc white
18.0 parts of magnesium carbonate
18.0 parts of siliceous limestone
20.0 parts of whiting
1.2 parts of sulfur
1.0 part of dibenzo thiazyl disulfide, and
60.0 parts of an aqueous 50% emulsion of a resin made according to Example 2 are thoroughly masticated and compounded with each other and the water is removed from said composition by pressing and drying. The rubber composition is vulcanized in customary manner and yields a vulcanized product superior to a vulcanized product of the same composition but without the addition of said resin.

EXAMPLE 8

100.0 parts of crepe rubber
12.0 parts of factice
16.0 parts of zinc white
190 parts of finely ground whiting
8.0 parts of titanium dioxide
1.0 part of wool fat acid
3.0 parts of sulfur
1.0 part of dibenzene mercaptyl disulfide
0.2 part of hexamethylene tetramine, and
100.0 parts of an aqueous 60% emulsion of a resin made according to Example 1 are thoroughly compounded and masticated as described in Example 5. The resulting rubber composition, on vulcanization, yields a vulcanized product far superior to the same composition without the addition of the resin emulsion. The following examples give similar rubber compositions of superior quality.

EXAMPLE 9

100.0 parts of smoked sheets
3.0 parts of sulfur
1.0 part of benzo thiazyl disulfide
0.4 part of diphenyl guanidine
5.0 parts of zinc oxide (zinc white)

3.0 parts of stearic acid
60.0 parts of silicic acid
50.0 parts of an aqueous 50% emulsion of a resin made according to Example 1 is mixed with varying amounts of an aqueous 50% emulsion of a resin obtained according to Example 14. The following table shows the improvement achieved by the addition of said resin.

| Amount of resin added, percent | Vulcanization | Spec. density, g./cc. | Ultimate tearing strength, kg./sq. cm. | Elongation of break, percent | DVM hardness number, mm./100 | Elasticity on impact | Structural strength, kg-/cm. | Abrasion |
|---|---|---|---|---|---|---|---|---|
| 0 | 3 atmospheres gauge at 140° C. for 25 minutes. | | 89 | 490 | 55 | 60 | 6.5 | 275 |
| 0 | | 1.17 | 81 | 465 | 55 | 58 | | |
| 20 | | | 154 | 535 | 60 | 57 | 14.3 | 290 |
| 20 | | 1.19 | 134 | 540 | 60 | 54 | | |
| 40 | | | 118 | 480 | 60 | 44 | 17.3 | 337 |
| 40 | | 1.22 | 106 | 505 | 60 | 37 | | |
| 60 | | | 104 | 470 | 68 | 30 | 12.2 | 415 |
| 60 | | 1.22 | 91 | 480 | 68 | 27 | | |

EXAMPLE 10

97.0 parts of a mixed polymerization product of 67% of butadiene-1,3 and 33% of acrylonitrile
5.0 parts of zinc oxide
70.0 parts of titanium dioxide
1.0 part of stearic acid
15.0 parts of dibutyl phthalate
1.5 parts of bis-(2-benzo thiazyl) disulfide
1.5 parts of sulfur, and
80.0 parts of an aqueous 50% emulsion of a resin obtained according to Example 3

EXAMPLE 11

100.0 parts of a polymerization product obtained from 67% of butadiene and 33% of styrene
50.0 parts of silicon dioxide ("Teg")
5.0 parts of zinc oxide
2.0 parts of sulfur
1.0 part of N-phenyl-α-naphthylamine
0.5 part of stearic acid
1.5 parts of di-o-tolyl guanidine, and
100.0 parts of an aqueous 50% emulsion of a resin obtained according to Example 2

EXAMPLE 12

100.0 parts of smoked sheets
3.0 parts of zinc white
2.0 parts of magnesium oxide
2.0 parts of sulfur
1.0 part of benzothiazyl disulfide
50.0 parts of kaolin
5.0 parts of a resin obtained according to Example 1

EXAMPLE 13

A standard rubber composition compounded from 100 parts of smoked sheets
3.0 parts of sulfur
5.0 parts of zinc white
2.0 parts of wool fat
1.0 part of magnesium oxide
1.0 part of benzothiazyl disulfide
0.4 part of diphenyl guanidine, and
50.0 parts of silicon dioxide ("Teg")

It is evident that substantially all the strength characteristics of vulcanized rubber products compounded with a resin according to the present invention are improved. It was furthermore found that addition of several percent of polyvinyl chloride or polyvinyl acetate does not substantially impair the strength characteristics of vulcanized products made from the above given rubber compositions.

EXAMPLE 14

100 parts of a furfural extract of mineral oil are heated with 60 parts of 98% nitric acid at about 90° C. while stirring and adding the nitric acid drop by drop to said mineral oil extract. Heating at 90° C. is continued until the reaction is complete. The temperature of the reaction mixture is then carefully increased to 140° C. and heating at said temperature is continued until foaming ceases. A reddish brown, acid-free, brittle resin is obtained which is soluble in xylene, benzene, turpentine substitute, and other solvents.

The resulting resin can be used as such, without further purification. Its softening point determined according to the method of Kraemer-Sarnoff is 43° C.

Acid number _____ 40
Saponification number _____ 145
Iodine number _____ 13
Ash content _____percent__ 0.1
Loss on evaporation:
    1 hour at 105° C _____percent__ 2.3
    1 hour at 150° C _____do____ 3.7

EXAMPLE 15

1 kg. of Buna rubber latex containing 60% rubber calculated as percentage of solids, is intimately mixed with varying amounts of an aqueous 50% emulsion of a resin obtained according to Example 14. 100 g. of the resulting mixture contain, calculated as percentage of solids, 0%, 20%, 40%, and 60% of said resin. Said latex is precipitated by coagulation by the addition of a dilute alum solution. The coagulated mass is washed, dried, and compounded with fillers, sulfur, vulcanization accelerators and softeners to yield a composition of 100.0 parts of the mixture of rubber and resin
3.0 parts of sulfur
1.0 part of benzene thiazyl disulfide
0.4 part of diphenyl guanidine
5.0 parts of zinc white
1.0 part of magnesium oxide
50.0 parts of alumina gel
2.0 parts of wool fat The compounded composition is then vulcanized. The following table shows the improvement achieved by the addition of a resin according to the present invention:

| Amount of resin added, percent | Vulcanization | Spec. density, g./cc. | Ultimate tearing strength, kg./sq. cm. | Elongation of break, percent | DVM hardness number, mm./100 | Elasticity on impact | Structural strength, kg./cm. | Abrasion |
|---|---|---|---|---|---|---|---|---|
| 0 | 3 atmospheres gauge at 140° C. for 25 minutes. | | 100 | 245 | 78 | 60 | 6.0 | 275 |
| 0 | | 1.21 | 104 | 235 | 79 | 60 | | |
| 20 | | | 118 | 390 | 76 | 44 | 14.2 | 290 |
| 20 | | 1.26 | 126 | 385 | 76 | 41 | | |
| 40 | | | 124 | 320 | 75 | 35 | 16.3 | 337 |
| 40 | | 1.26 | 118 | 270 | 75 | 34 | | |
| 60 | | | 122 | 370 | 74 | 25 | 13.9 | 417 |
| 60 | | 1.28 | 106 | 320 | 75 | 24 | | |

As in Example 13, most of the strength properties of Buna rubber mixtures with the resinous dispersing agent according to the present invention are considerably improved.

It is, of course, also possible to further process the coagulated latex without vulcanization. Before or after coagulation other high molecular substances which are soluble in the resin and the coagulated resin-rubber mass. Especially suitable polymers of this type are, for instance, polymers of the polyvinyl series, such as polyvinyl chloride, polyvinyl acetate, other polyvinyl esters, polyacrylic acid esters, and the like. Inorganic fillers, coloring matter, and other rubber additives may also be added before the rubber-resin latex is coagulated. If required, satisfactory dispersion of such additives throughout the latex is effected by the addition of emulsifying agents, such as potassium oleate, sodium oleate, lecithine, sodium stearate, casein, rosin acids, naphthenate.

EXAMPLE 16

1.0 kg. of a natural rubber latex containing 60% rubber, calculated as percentage of solids, are intimately mixed with varying amounts of an aqueous 50% emulsion of a resin obtained according to Example 14, whereby 20% of said natural rubber is substituted by said varying amounts of resin. The resulting mixtures contain, calculated as percentage of natural rubber latex, 0%, 10%, 30%, and 50% of said resin. The latex mixtures are precipitated, compounded, and vulcanized as described in Example 15. The following table shows the strength properties of such vulcanizates.

| Strength properties | Resin addition | | | |
|---|---|---|---|---|
| | 0% | 10% | 30% | 50% |
| Shore hardness | 65 | 65 | 65 | 60 |
| Elasticity | 25 | 24 | 22 | 21 |
| Stress at 200% elongation in kg./sq. cm | 41 | 45 | 37 | 23 |
| Resistance to tear in kg./sq. cm | 70 | 73.5 | 70 | 55 |
| Elongation at break in percent | 305 | 300 | 335 | 370 |

It is evident that the elasticity decreases somewhat with increasing amounts of resin. The Shore hardness, however, is affected only on addition of 50% of said resin. Likewise the resistance to tear remains substantially constant, provided the resin content does not exceed about 30%. The elongation at break increases with increasing addition of resin.

The resin addition has the further remarkable advantage that vulcanized articles containing resin can be more readily removed from the mold than articles without such addition.

The resin-rubber mixture is of brown color and becomes dark black on drying and on vulcanization.

EXAMPLE 17

20% of the rubber content of a natural rubber latex of medium quality are replaced by a 50% aqueous emulsion of the resin obtained according to Example 14. Rubber buffers are made from said latex with or without addition of resin. Testing said rubber buffers yields the following results:

| Strength Properties | Without addition | With addition |
|---|---|---|
| Shore hardness | 58 | 58 |
| Elasticity | 25 | 24 |
| Specific gravity | 1.259 | 1.262 |
| Stress at 200% elongation in kg./sq. cm | 19 | 16 |
| Resistance to tear in kg./sq. cm | 54.5 | 51.5 |
| Elongation at break in percent | 300 | 290 |

It is evident that it is possible to replace 20% of natural rubber in rubber latex of medium quality by said resin without substantially impairing the strength properties of the resulting products.

EXAMPLE 18

100 parts of Buna S latex containing 32% solid matter are mixed with 40 parts of a 50% aqueous emulsion of a resin obtained according to Example 14. The mixture is compared with Buna S 3 Defo 1000, without such resin addition, with respect to its behavior on the masticator as well as with respect to its physical and strength properties.

On mastication, the resin containing Buna S rubber yields much more readily a coherent sheet than normal Buna S rubber. Filler materials were readily and rapidly dispersed throughout said sheet. No sticking of the sheet to the masticator rolls is observed even at a somewhat higher temperature.

The physical and strength properties of three types of such rubber compositions are tested, namely:

(a) Of a normal technical Buna S mixture having a Shore hardness of about 65°, (b) Of a rather highly elastic Buna S mixture having a Shore hardness of about 50°, and (c) Of a harder Buna S mixture containing a larger amount of filler materials and also reclaimed rubber, having a Shore hardness of about 80°.

The mixtures have the following composition and the vulcanizates exhibit the following physical and strength properties when vulcanized at optimum temperature and duration.

Sample A

| | Parts |
|---|---|
| Buna S 3 or Buna S-resin mixture according to the present invention | 50.0 |
| Dithioglycolic acid butyl ester (brand WM 77 Bayer) | 4.5 |
| Naftolen | 5.0 |
| Paraffin | 0.6 |
| Phenyl-β-naphthylamine | 0.5 |
| Sulfur | 1.0 |
| N-cyclohexyl-2-benzo thiazyl sulfene amide (brand Vulcazit CZ Bayer) | 1.0 |
| Zinc white (brand Rotsiegel) | 2.4 |
| Carbon black (brand Elastic) | 15.0 |
| Carbon black (brand CK 3) | 20.0 |

Optimum vulcanization at 143° C. for 17 minutes.

| Physical and strength properties | Normal Buna S3 without resin | Buna S with resin |
|---|---|---|
| Specific gravity | 1.19 | 1.19 |
| Resistance to tear in kg./sq. cm | 97 | 106 |
| Elongation at break in percent | 320 | 610 |
| Shore hardness, degrees | 65 | 65 |
| Elasticity on impact in percent | 50 | 39 |
| Resistance to continuing tearing in kg./cm | 11.4 | 21.8 |

*Sample B*

| | Parts |
|---|---|
| Buna S 3 Defo 1000 or Buna S-resin mixture according to the present invention | 51.0 |
| Dioctyl phthalate | 13.0 |
| Ozocerite wax | 0.3 |
| Phenyl-β-naphthylamine | 1.0 |
| Sulfur | 1.0 |
| Diphenyl guanidine | 0.2 |
| N-cyclohexyl-2-benzothiazyl sulfene amide (brand Vulcazit CZ Bayer) | 0.3 |
| Activated zinc oxide | 3.2 |
| Siliceous chalk | 5.0 |
| Carbon black (brand LuV 36) | 15.0 |
| Carbon black (CK 3) | 10.0 |

Optimum vulcanization at 143° C. for 17 minutes.

| Physical and strength properties | Normal Buna S3 without resin | Buna S with resin |
|---|---|---|
| Specific gravity | 1.18 | 1.19 |
| Resistance to tear in kg./sq. cm | 85 | 85 |
| Elongation at break in percent | 740 | 740 |
| Shore hardness, degrees | 50 | 45 |
| Elasticity on impact in percent | 55 | 41 |
| Resistance to continuing tearing in kg./cm | 3.0 | 7.4 |

*Sample C*

| | Parts |
|---|---|
| Buna S 3 Defo 1000 or Buna S-resin mixture according to the present invention | 13.0 |
| Plasticizer (brand Oeldampfplastikat Klasse) fractice | 25.0 |
| Ground technical reclaimed rubber class 2 | 13.0 |
| Naftolen | 8.5 |
| Bitumen (brand H. V. Bitumen) | 4.0 |
| Phenyl-β-Naphthylamine | 0.5 |
| Resin (brand Zewaharz of Zellstofffabrik Mannheim, lignin product) | 1.0 |
| Sulfur | 1.0 |
| N-cyclohexyl-2-benzothiazyl sulfene amide (brand Vulcazit CZ Bayer) | 5.0 |
| Zinc white (brand Rotsiegel) | 5.0 |
| Carbon black (brand CK 3) | 28.2 |

Optimum vulcanization at 143° C. for 17 minutes.

| Physical and strength properties | Normal Buna S3 without resin | Buna S with resin |
|---|---|---|
| Specific gravity | 1.35 | 1.36 |
| Resistance to tear in kg./sq. cm | 56 | 58 |
| Elongation at break in percent | 140 | 140 |
| Shore hardness, degrees | 80 | 85 |
| Elasticity on impact in percent | 15 | 14 |
| Resistance to continuing tearing in kg./cm | 2.7 | 3.6 |

The tests were carried out according to the following standard methods:

| | |
|---|---|
| Resistance to tear and elongation at break | DIN 53 504 |
| Softness or hardness, respectively | DIN 53 503 |
| Elasticity on impact | DIN 53 512 |
| Resistance to continuing tearing (strip test) | DIN 53 507 |

These data show that addition of resin according to the present invention causes an increase in the elongation at break while hardness and resistance to tear remain substantially unchanged. Elasticity on impact decreases somewhat, but resistance to continuing tearing is substantially increased. It follows that addition of 20% to 60% and even more of the resins obtained according to this invention by treating selective extracts of the petroleum industry with nitric acid and the like oxidizing agents considerably increases the structural strength properties and the resistance to tear of vulcanized goods made from such rubber compositions.

As starting materials there may be used, as stated above, not only hydrocarbons as they are obtained by selective extraction of petroleum with furfural, liquid sulfur dioxide and the like but also distillates and fractions of extracts and hydrocarbons of similar composition as they are obtained by selective extraction or distillation of lignite tar oils, shale oils, and other tar oils. Oils as they are obtained on chemical refining of petroleum and the like by means of sulfuric acid and on neutralizing and distilling of acid sludge are also suitable. The preferred starting materials are, however, the selective extracts obtained from petroleum.

Of course, many changes and variations in the composition of the resins and the rubber mixtures, the methods of making such resins and of compounding them with rubber, and the like may be made by those skilled in the art in accordance with the principles set forth herein and in the claims annexed hereto.

An aqueous emulsion of the resinous rubber additive according to the present invention may, for instance, be composed of 0.1 part of potassium oleate, 0.1 part of ammonia, 100 parts of water, and 100 parts of said resin.

Such an emulsion is prepared, for instance, by adding 100 parts of said molten resin to 100 parts of water containing 0.1 part of potassium oleate and 0.1 part of ammonia while stirring and maintaining the emulsifying temperature at about 100° C.

I claim:

1. A rubber composition comprising rubber latex and, intimately dispersed therethrough, an aqueous emulsion of a resinous reaction product of nitric acid with a mineral oil fraction boiling at a temperature of at least about 250° C. and obtained on selectively extracting mineral oils by means of selectively acting solvents, said solvents being selected from the group consisting of furfural, liquid sulfur dioxide, nitrobenzene, propane, phenols, and β,β-dichloro ethyl ester.

2. A rubber composition comprising rubber latex and, intimately dispersed therethrough, a resinous reaction product of a polycyclic hydrocarbon mixture and nitric acid, said polycyclic hydrocarbon mixture being selected from the group consisting of an extract obtained on selectively extracting mineral oil with furfural and an extract obtained on selectively extracting mineral oil with liquid sulfur dioxide.

3. A rubber composition comprising rubber latex and, intimately dispersed therethrough, a resinous reaction product of a polycyclic hydrocarbon mixture and nitric acid, said polycyclic hydrocarbon mixture being selected from the group consisting of an extract obtained on selectively extracting mineral oil with furfural and an extract obtained on selectively extracting mineral oil with liquid sulfur dioxide.

4. A rubber composition comprising rubber latex and, intimately dispersed therethrough, a resinous reaction product of nitric acid and a high boiling selective extract of a mineral oil with furfural, said extract having a boiling point of at least about 250° C.

5. A rubber composition comprising rubber latex and, intimately dispersed therethrough, a resinous reaction product of nitric acid and a high boiling selective extract of a mineral oil with furfural, said extract having a boiling point of at least about 250° C., said resinous reaction product being present in said rubber composition in an amount corresponding to between 20% and 60% of its rubber content.

6. A rubber composition comprising rubber and, intimately dispersed therethrough, a resinous reaction product of nitric acid and a high boiling selective extract of a mineral oil with furfural, said extract having a boiling point of at least about 250° C., said resinous reaction product being present in said rubber composition in an amount corresponding to between 20% and 60% of its rubber content.

7. A rubber composition comprising rubber and, intimately dispersed therethrough, a resinous reaction product of nitric acid and a high boiling selective extract of a mineral oil with furfural, said extract having a boiling point of at least about 250° C., and a resinous polyvinyl compound, said resinous reaction product being present in said rubber composition in an amount corresponding to between 20% and 60% of its rubber content.

8. A vulcanized rubber article of improved strength characteristics comprising vulcanized rubber and, intimately dispersed therethrough, conventional rubber additions and a resinous reaction product of nitric acid and a high boiling selective extract of a mineral oil with furfural, said extract having a boiling point of at least about 250° C., and a resinous polyvinyl compound.

9. In a process of modifying rubber compositions, the step comprising incorporating in rubber, before addition of filler materials, a resinous reaction product of a polycyclic hydrocarbon mixture and nitric acid, said polycyclic hydrocarbon mixture being selected from the group consisting of an extract obtained on selectively extracting mineral oil with furfural and an extract obtained on selectively extracting mineral oil with liquid sulfur dioxide.

10. In a process of modifying rubber compositions, the steps comprising incorporating into a rubber latex an aqueous emulsion of a resinous reaction product of a polycyclic hydrocarbon mixture and nitric acid, said polycyclic hydrocarbon mixture being selected from the group consisting of an extract obtained on selectively extracting mineral oil with furfural and an extract obtained on selectively extracting mineral oil with liquid sulfur dioxide, coagulating said latex-resin mixture, drying said coagulate, compounding it to a vulcanizable rubber composition, and vulcanizing said rubber composition.

References Cited in the file of this patent
UNITED STATES PATENTS
2,217,918    Rostler et al. _____ Oct. 15, 1940
OTHER REFERENCES
"Rubber Age," February 1944, page 427.